United States Patent
Yoo et al.

(10) Patent No.: US 12,113,713 B2
(45) Date of Patent: Oct. 8, 2024

(54) CONTROL CHANNEL ISOLATION WITH TIME-SERIES CONTROL TRAFFIC PREDICTION IN PROGRAMMABLE NETWORK VIRTUALIZATION

(71) Applicant: KOREA UNIVERSITY RESEARCH AND BUSINESS FOUNDATION, Seoul (KR)

(72) Inventors: Yeonho Yoo, Seoul (KR); Gyeongsik Yang, Seoul (KR); Changyong Shin, Seoul (KR); Jeunghwan Lee, Seoul (KR); Hyuck Yoo, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 0 days.

(21) Appl. No.: 18/206,813

(22) Filed: Jun. 7, 2023

(65) Prior Publication Data

US 2024/0171517 A1    May 23, 2024

(30) Foreign Application Priority Data

Nov. 18, 2022    (KR) .......................... 10-2022-0155709

(51) Int. Cl.
*H04L 41/16*    (2022.01)
*H04L 47/22*    (2022.01)
(Continued)

(52) U.S. Cl.
CPC ............ *H04L 47/225* (2013.01); *H04L 41/16* (2013.01); *H04L 41/40* (2022.05); *H04L 43/20* (2022.05); *H04L 47/11* (2013.01)

(58) Field of Classification Search
CPC ... H04L 41/16; H04L 41/147; H04L 41/0816; H04L 43/02; H04L 43/0894; H04L 43/20; H04L 47/11
See application file for complete search history.

(56) References Cited

U.S. PATENT DOCUMENTS 10,397,124 B2 *    8/2019    Atli .......................... H04L 47/30
2015/0341235 A1 *    11/2015    Ni .......................... H04L 43/062
                                                                    370/392

(Continued)

FOREIGN PATENT DOCUMENTS

KR        10-1672661 B1    11/2016
KR        10-1909557 B1    10/2018
(Continued)

OTHER PUBLICATIONS

Q. Zhaowei, L. Haitao, L. Zhihui and Z. Tao, "Short-Term Traffic Flow Forecasting Method With M-B-LSTM Hybrid Network," in IEEE Transactions on Intelligent Transportation Systems, vol. 23, No. 1, pp. 225-235, Jan. 2022 (Year: 2022).*

(Continued)

*Primary Examiner* — Tom Y Chang
(74) *Attorney, Agent, or Firm* — NSIP Law (57) ABSTRACT

Disclosed is a network hypervisor apparatus for providing a software defined networking (SDN)-based virtual network, the network hypervisor apparatus including a data collector configured to collect control traffic data and network topology information for each virtual switch; a control traffic predictor configured to predict future control traffic based on the control traffic data and the network topology information; and a translator configured to translate a control message corresponding to a virtual switch based on a prediction result.

5 Claims, 6 Drawing Sheets

① Collect control traffic and variables
② Request prediction from control traffic prediction model and deliver prediction value
③ Calculate control value (γ)
④ Translate control traffic while maintaining γ for each virtual switch (51) Int. Cl.
  *H04L 41/40* (2022.01)
  *H04L 43/20* (2022.01)
  *H04L 47/11* (2022.01)

(56) References Cited

U.S. PATENT DOCUMENTS

| | | | |
|---|---|---|---|
| 2019/0297520 | A1* | 9/2019 | Vedam .................... H04L 47/83 |
| 2021/0303389 | A1* | 9/2021 | Gadi ........................ G06N 3/08 |
| 2021/0307673 | A1* | 10/2021 | Daoud ................... A61B 5/369 |
| 2022/0004897 | A1* | 1/2022 | Jadon ..................... G06N 3/084 |
| 2022/0414977 | A1* | 12/2022 | Surti ..................... G06T 15/005 |
| 2023/0217308 | A1* | 7/2023 | Sandberg ................ H04L 41/16 |
| | | | 370/235 |

FOREIGN PATENT DOCUMENTS

| KR | 10-2018-0122513 A | 11/2018 |
|---|---|---|
| KR | 10-2011021 B1 | 8/2019 |
| KR | 10-2020-0002439 A | 1/2020 |
| KR | 10-2022-0030050 A | 3/2022 |
| KR | 10-2022-0030193 A | 3/2022 |

OTHER PUBLICATIONS

S. P. Sone, J. J. Lehtomäki and Z. Khan, "Wireless Traffic Usage Forecasting Using Real Enterprise Network Data: Analysis and Methods," in IEEE Open Journal of the Communications Society, vol. 1, pp. 777-797, 2020 (Year: 2020).*

S. Gong, M. Li, X. Dong and H. Cheng, "Prediction model of network link traffic in cloud environment," 2022 IEEE 10th Joint International Information Technology and Artificial Intelligence Conference (ITAIC) (Year: 2022).*

* cited by examiner

CONTROL CHANNEL ISOLATION WITH TIME-SERIES CONTROL TRAFFIC PREDICTION IN PROGRAMMABLE NETWORK VIRTUALIZATION

CROSS-REFERENCE TO RELATED APPLICATION(S)

This application claims the benefit under 35 USC § 119(a) of Korean Patent Application No. 10-2022-0155709 filed on Nov. 18, 2022 in the Korean Intellectual Property Office, the entire disclosure of which is incorporated herein by reference for all purposes.

BACKGROUND

1. Field

At least one example embodiment relates to a method of predicting control traffic between a software defined networking (SDN) controller and a virtual switch of a network hypervisor and achieving isolation between control channels, and more particularly, to a method of predicting control traffic between a controller and a hypervisor in time series and isolating a control channel such that a plurality of virtual switches provided by a single network hypervisor do not interfere with each other.

2. Description of Related Art

Software defined networking (SDN) refers to a networking structure in which the entire network is controllable with a single method by separating networking equipment into a control plane and a data plane and by centralizing the control plane and has an advantage of assigning flexibility and programmability to a network that is dependent on the existing manufacturers and difficult to apply new research. A control plane of a centralized switch is referred to as an SDN controller and may control a transmission plane configured with network resources, such as a switch and a link.

SDN may separate traditional hardware-based networking equipment into the control plane and the data plane and may control the entire network at the center through the SDN controller. Also, the SDN controller assigns programmability to a network such that a user may directly perform a variety of network control, such as routing and security, with software. Here, in SDN, network virtualization refers to technology that divides a single physical network into a plurality of virtual networks and then provides the same. SDN-based network virtualization may be implemented using a network hypervisor. The network hypervisor may provide a virtual network that meets a demand of a user and may abstract not a physical switch but a virtual switch such that the SDN controller may control the virtual switch.

A time-series prediction model treats time-series data. The time-series data represents a series of data recorded in chronological order. Representative examples of the time-series data include stock prices recorded in minutes, precipitation recorded in months, and the like. The time-series prediction model predicts future time-series data based on a series of past time-series data. To this end, the time-series prediction model finds and learns a plurality of patterns hidden in the time-series data (time-series analysis). Typically, if the time-series prediction model mainly deals with univariate time-series data that considers only a pattern of a temporal flow of single type of data, more complex multivariate time-series data is dealt by analyzing correlation between a plurality of data observed over time. Representative examples of the time-series prediction model may be autoregressive integrated moving average (ARIMA), recurrent neural network (RNN), long short-term memory (LSTM), LSTM-autoencoder, and the like. Control traffic between an SDN controller and a virtual switch controlled through a control channel may also be recorded as time-series data. Not only control traffic but also variables observed in temporal order may be learned with the time-series prediction model and may be analyzed in a time series manner.

Network virtualization is essential technology for providing an isolated network to tenants (clients that receives a network from a cloud) in the cloud. In particular, SDN-based network virtualization allows tenants to generate their own virtual networks on a physical network of the cloud and thus, is regarded as very important future technology. Since a tenant may directly design a composition of virtual switches of a virtual network provided to the tenant and may also optimally build a network according to a service provided from the tenant, the demand for this technology is continuously increasing.

A datacenter of the cloud aims to stably provide virtual networks of many tenants as simultaneously as possible. A network hypervisor generates a virtual switch from a physical switch to provide a virtual network and establishes a control channel between an SDN controller and the virtual switch. A control message is exchanged through the control channel and the network hypervisor needs to perform message translation such that the control message may be delivered to an actual physical switch. According to an increase in the number of virtual switches provided from the network hypervisor, the number of control messages to be translated increases. Since a single network hypervisor translates a large number of control messages based on a First-In First-Out (FIFO) method, severely long latency occurs. Specifically, in general, a control message needs to be delivered to the entire switches of the network such that the SDN controller may perform a network control, such as network forwarding rule installation and network monitoring. In network virtualization, when the network hypervisor translates a control message installed by the SDN controller in the virtual switch and delivers the translated control message to the physical network, the SDN controller, that is, the tenant may perform a desired network control.

In the present invention, through experiments, it was confirmed that a control message translation time increased by up to 11.7 times when the number of virtual switches is 128 compared to 8 in the existing network hypervisor and a forwarding rule installation time increased by 12 times and a network monitoring time increased by 12.9 times. This suggests that, as the number of virtual switches, that is, the number of control channels increases, mutual interference increases and isolation is not achieved. Therefore, the present invention is to outperform in network control performance according to an increase in the number of virtual switches by predicting real-time control traffic for each virtual switch and by controlling and isolating traffic based on a prediction value.

SUMMARY

A technical subject of at least one example embodiment is to provide a method and apparatus for control channel isolation in programmable network virtualization based on control traffic time series prediction.

According to an aspect of an example embodiment, there is provided a network hypervisor apparatus for providing a software defined networking (SDN)-based network virtualization, the network hypervisor apparatus including a data collector configured to collect control traffic data and network topology information for each virtual switch; a control traffic predictor configured to predict future control traffic based on the control traffic data and the network topology information; and a translator configured to translate a control message corresponding to a virtual switch based on a prediction result.

According to a network hypervisor apparatus according to an example embodiment, it is possible to isolate a control channel through control traffic time series prediction in programmable network virtualization.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The aforementioned features and effects of the disclosure will be apparent from the following detailed description related to the accompanying drawings and accordingly those skilled in the art to which the disclosure pertains may easily implement the technical spirit of the disclosure.

Various modifications and/or alterations may be made to the disclosure and the disclosure may include various example embodiments. Therefore, some example embodiments are illustrated as examples in the drawings and described in detailed description. However, they are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component.

For example, a first component may be referred to as a second component, or similarly, the second component may be referred to as the first component within the scope of the present disclosure. As used herein, the term "and/or" includes any and all combinations of one or more of the associated listed items.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Hereinafter, example embodiments will be described with reference to the accompanying drawings. However, the scope of the patent application is not limited to or restricted by the example embodiments. Like reference numerals used in the respective drawings refer to like elements throughout.

Initially, terms used herein are described.

Network controller: The network controller represents an element used to control a virtual network of each user. In a software defined networking (SDN)-based virtual network, a user's centralized virtual network controller serves as a control plane and performs communication, such as exporting a rule necessary for data transmission through a virtual switch and a protocol, such as OpenFlow.

Network hypervisor: The network hypervisor represents an element that provides a separate virtual network to each of users when a plurality of users using different SDN controllers is present and the users use a single shared physical network. The network hypervisor serves to manage mapping information between virtual network resources and physical network resources and to change a control message, such as OpenFlow, from a virtual network controller to a form suitable for the physical network.

Control traffic: The SDN controller generates a control channel with each switch to control a network and exchanges numerous control messages through the control channel. Such messages are called control traffic. In network virtualization, since the SDN controller is unaware of presence of a physical network, the control message generated by the SDN controller controls only a virtual network. Therefore, a modification process is required for a network hypervisor that abstracts the virtual network from the physical network to deliver the control message of the SDN controller to a physical switch. This process is referred to as a mess age translation.

Long short-term memory (LSTM): The LSTM refers to a neural network structure designed to enable long-term and short-term memory by supplementing a disadvantage incapable of applying past information as time-series data predicted by a recurrent neural network (RNN) becomes longer. The RNN is in a type of a chain structure in which a result of a hidden layer is received as an input of the same hidden layer. This structure allows the RNN to consider order or time information. However, since the RNN does not have a structure capable of storing separate past information, the RNN does not reflect past information when outputting future data to some extent. On the contrary, the LSTM manages separate information called a cell state capable of expressing importance of past data over time through three gates, that is, forget, input, and output gates. The forget gate determines an amount of data to forget, the input gate determines an amount of data to reflect, and the output gate determines data to transmit to a next cell.

The present invention is conceived to solve a "control traffic isolation" issue. That is, the present invention is to outperform a message translation bottleneck of a network hypervisor that causes a network control latency degraded according to an increase in the number of virtual switches. The bottleneck occurs since a message translation operation in the existing network hypervisor processes messages in received order regardless of a virtual switch and message processing of other switches is delayed accordingly while processing messages first come to a specific switch. Therefore, the present invention predicts control traffic of the SDN controller received by the virtual switch at a preset short time interval and adjust throughput of the control traffic. Through this, it is possible to alleviate the bottleneck by reducing an amount of control traffic that the network hypervisor translates per second and to improve network control performance.

Also, the present invention generates a new control traffic prediction model to predict accurate control traffic. To this end, an LSTM-autoencoder model for time series prediction of control traffic is designed. The LSTM-autoencoder model outperforms the existing time series models (ARIMA) for prediction accuracy by up to 2.2 times.

Hereinafter, an LSTM-autoencoder-based control traffic prediction model is further described.

The LSTM-autoencoder-based control traffic prediction model is designed to predict control traffic received from the SDN controller. To this end, time-series analysis is performed between past data and future data of control traffic.

Figure 1:
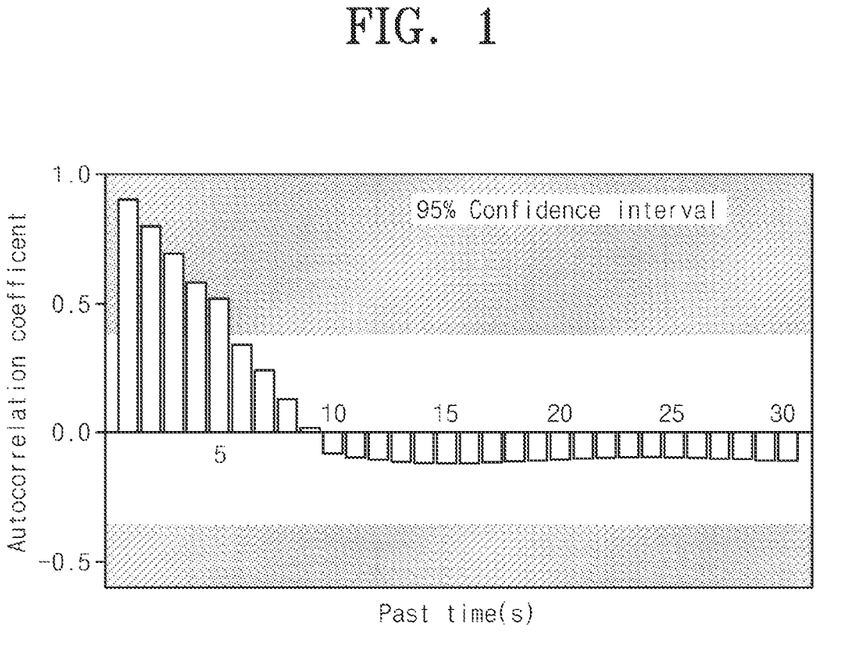
FIG. 1 is a graph showing autocorrelation coefficients of control traffic.

An autocorrelation coefficient (autocorrelation) of control traffic data most widely used for time-series analysis was measured. The autocorrelation coefficient is a metric used to verify a relationship between current data and past data. To collect data, control traffic was transmitted to 128 virtual switches and control traffic was measured at an interval of 1 second during 120 seconds and recorded. Autocorrelation coefficients were measured using 120 pieces of time-series data and FIG. 1 shows a measurement result up to 30 seconds (s). In the graph of FIG. 1, the x-axis denotes the past time relative to the current time and the y-axis denotes autocorrelation coefficients by a corresponding past time. If 95% confidence interval is exceeded (shaded portion of the graph in FIG. 1), it may be determined that there is a correlation with the past time. As a measurement result, autocorrelation of the control traffic exceeds the shaded portion in an interval from 1 s to 5 s. Therefore, the control traffic may be determined to have autocorrelation with short past data by 5 s. Based on this, a model capable of predicting future control traffic with control traffic data of short past time may be designed.

Figure 2:
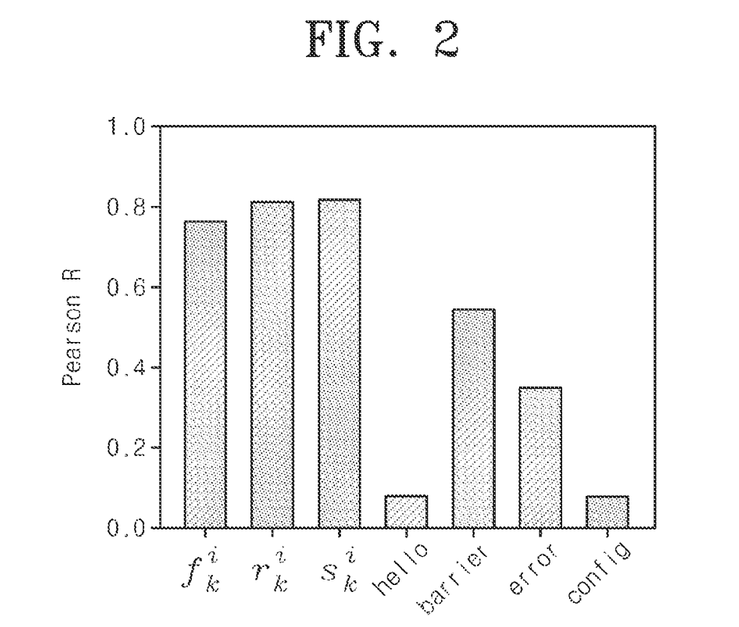
FIG. 2 is a graph showing Pearson R value between an amount of control traffic and the number of control messages.

The control traffic data is observed with various variables as well as control traffic of the past time. First, since control traffic is data of control messages, an amount of control traffic is associated with types and the number of control messages. Therefore, among control messages that constitute the control traffic, the number of FLOWMOD, PACKETIN, STATISTIC, HELLO, BARRIER, ERROR, and CONFIG messages were observed and recorded, and a Pearson R value that is a representative correlation analysis metric between the number of individual control messages and control traffic was measured. When Pearson R is closer to 1, it may be determined that correlation between two variables is high. When Pearson R is closer to 0, it may be determined that there is no correlation between two variables. Referring to FIG. 2 showing Pearson R between a control traffic amount and control messages, FLOWMOD, PACKETIN, and STATISTIC messages show Pearson R values close to 1 among six messages and may be determined to have great correlation with the control traffic. Therefore, at least one of the above three messages may be included as an input variable.

Second, control traffic of an individual switch is affected by a network environment. Therefore, network topology information that is a biggest element to the network environment may be added as an input variable. For example, in the network topology information, the number of hosts connected to a virtual switch (or physical switch) and the number of links of the virtual switch (or physical switch) may be included as input variables.

Therefore, the time-series prediction model is designed to learn a relationship with various variables by including at least one of five variables having great correlation with the control traffic, for example, the number of FLOWMOD messages, the number of PACKETIN messages, the number of STASTIC messages, the number of hosts, and the number of links).

Hereinafter, a control traffic prediction model based on an LSTM-autoencoder is described.

Figure 3:
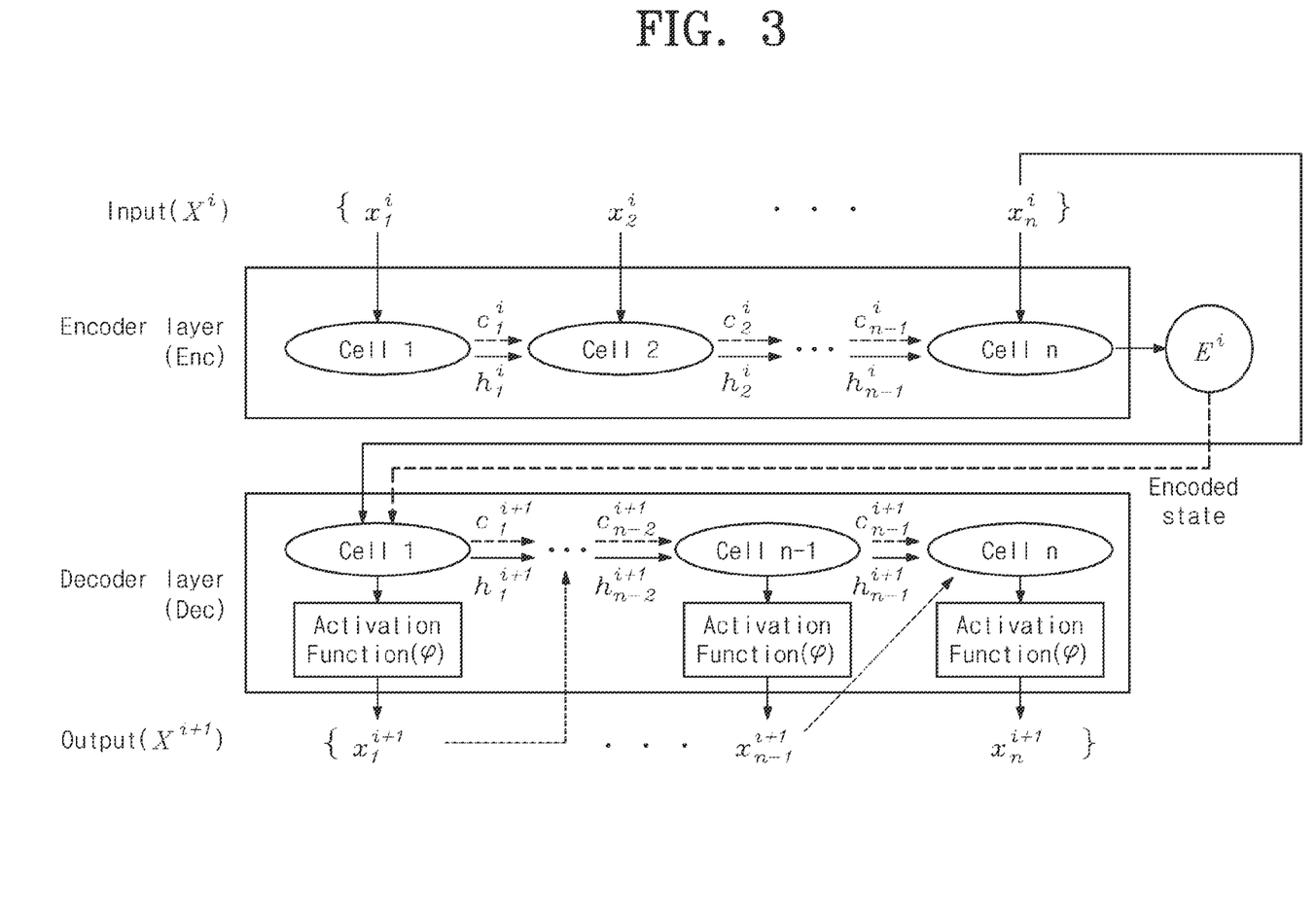
FIG. 3 illustrates a structure of a prediction model to which control traffic and other input variables are applied.

FIG. 3 illustrates a structure of a prediction model to which control traffic and other input variables are applied.

Referring to FIG. 3, input variables are observation data (past sequence data) measured at an interval of 100 ms for 2 seconds and an output value is control traffic data (future sequence data) of a next 2-second interval. The prediction model largely includes an encoder and a decoder. The encoder represents the past sequence data as a single piece of compressed data (encoded state) and the decoder receives the compressed data (encoded state) and the past sequence data and predicts future sequence data.

The encoder of the prediction model includes an LSTM cell. For the LSTM cell of the encoder, a total of 20 LSTM cells corresponding to the number of past sequence data are generated and configured and each LSTM cell generates a new value (cell state) for a single piece of data in the past sequence data. The cell state may be updated every time it passes the LSTM cell and time dependence between data and dependence information between input variables may be compressed and a last LSTM cell of the encoder may generate a single piece of information on the entire past sequence data, that is, compressed data (encoded state).

The decoder of the prediction model includes 20 LSTM cells and 20 activation functions. A first LSTM cell of the decoder generates a new cell state by updating the compressed data (encoded state) with last data among the compressed data (encoded state) and the past sequence data delivered from the encoder and outputs data of a next time using an activation function. A second LSTM cell receives cell state data and predicted data output from the first LSTM cell and then updates a hidden state and predicts data of a next time. When each of the 20 LSTM cells predicts future data, prediction of the future sequence data is terminated.

For training data of the prediction model, past-future sequence data for 300,000 control traffic was generated and used. Control traffic data of all switches within a virtual network starting from one virtual switch to 128 virtual switches was collected and the prediction model was able to learn time-series patterns of all control traffic with sufficient datasets. For hyperparameters of the prediction model, an optimal hyperparameter was searched through random search and Table 1 shows hyperparameters of the prediction model.

TABLE 1

| Hyperparameter | Best parameter | Hyperparameter | Best parameter |
| --- | --- | --- | --- |
| Loss function | MSE | Batch size | 720 |
| Activation Function | tanh | Optimizer | ADAM |

TABLE 1-continued

| Hyperparameter | Best parameter | Hyperparameter | Best parameter |
| --- | --- | --- | --- |
| Hidden layer size | 64 | Drop rate | 0.05 |
| Input sequence size | 2 s (20 records in 100 ms unit) | Learning rate | 0.01 |
| Output sequence size | 2 s (20 records in 100 ms unit) | Epoch | 200 |

Hereinafter, a control channel isolation method is described.

Figure 4:
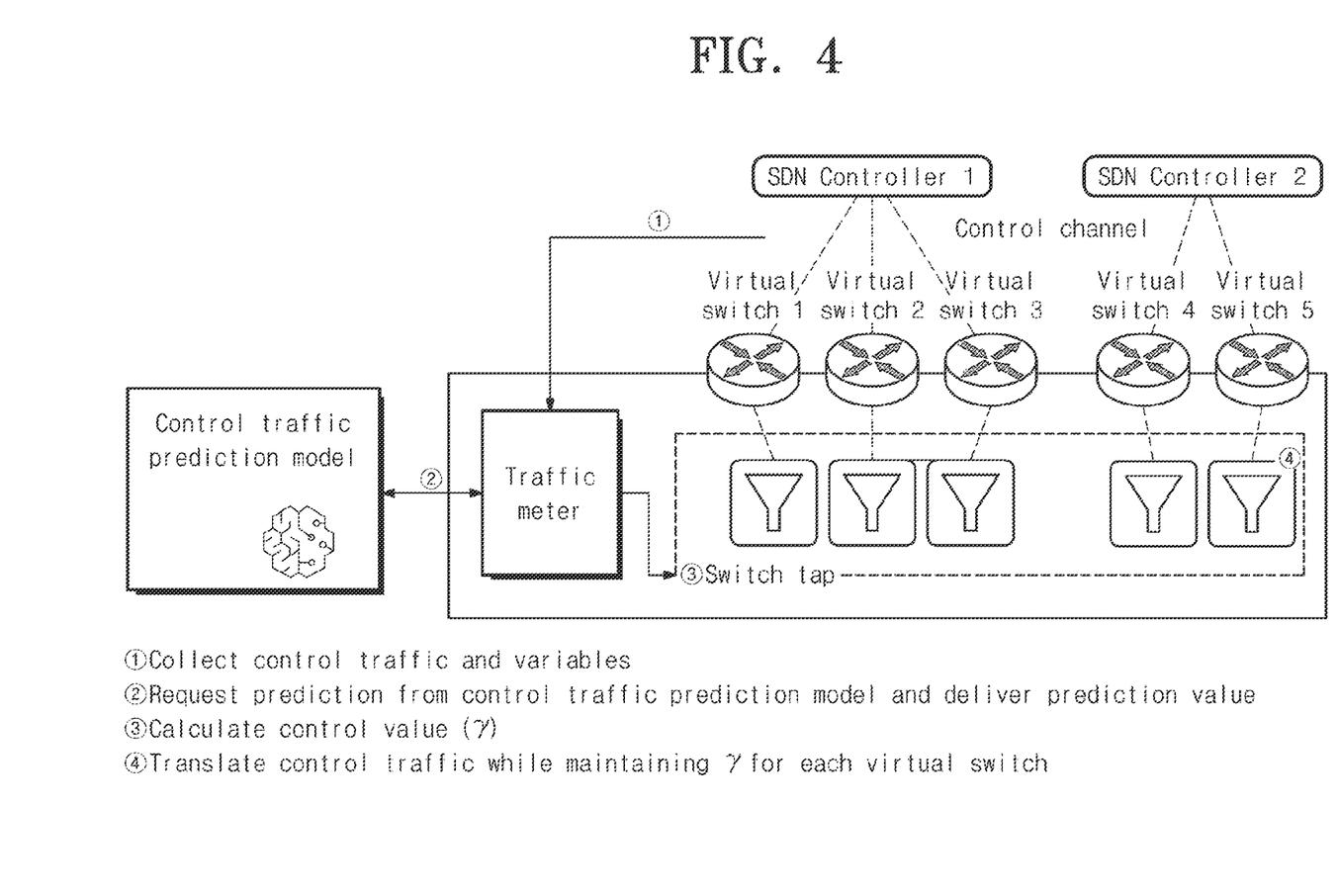
FIG. 4 illustrates a conceptual diagram for explaining a control channel isolation method.

FIG. 4 illustrates a conceptual diagram for explaining a control channel isolation method.

The proposed technique includes a traffic prediction model, a traffic meter, and a switch tap. At least a portion of the components may be implemented in a network hypervisor (or network hypervisor apparatus in which the network hypervisor is implemented). The traffic meter may collect control traffic and/or virtual network topology information within a specific time interval (window). Then, the traffic meter delivers the collected data to a traffic prediction model as an input value and the traffic prediction model delivers control traffic of a next window for each virtual switch to the switch tap. The switch tap calculates a control traffic amount (control value, γ) that the network hypervisor may translate for each virtual switch based on a prediction result. A control value is calculated per window for each virtual switch and the switch tap prevents a message that exceeds the control value to not be translated.

The traffic meter may collect data in units of input sequence and may perform preprocessing for the prediction model. Initially, through real-time monitoring, the traffic meter may collect control traffic information (control traffic amount, the number of FLOWMOD messages, the number of PACKETIN messages, the number of STATISTIC messages, and the number of hosts and the number of links connected to switch). Here, the traffic meter collects 20 data in units of 100 ms that is a minimum monitoring time and requests the control traffic prediction model to predict next future sequence data by converting the 20 data to a data format of a single time-series sequence.

Figure 5:
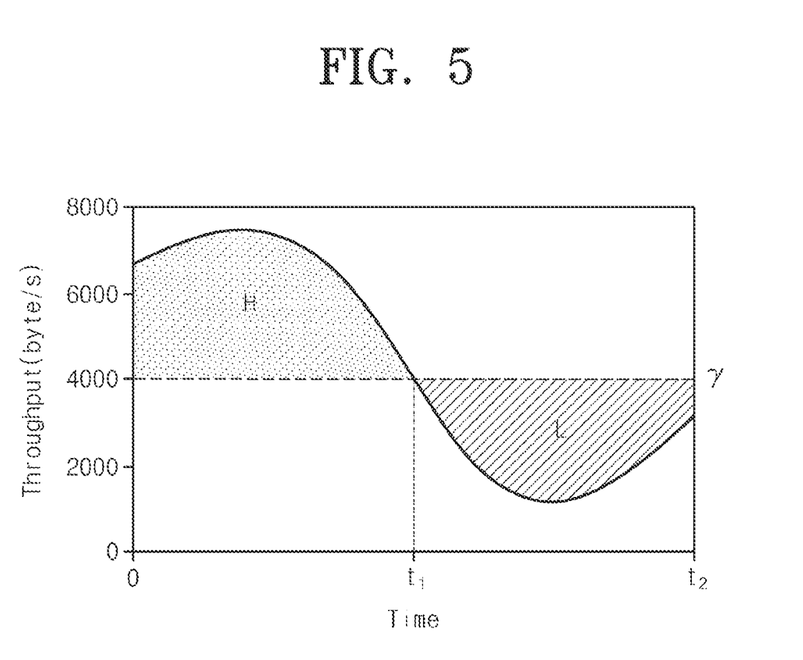
FIG. 5 illustrates sequence data predicted by a window size as a function.

The switch tap receives control traffic predicted for next sequence from the prediction model and calculates a control value (γ). The basic idea of calculating a control value is to perform processing (i.e., translation) on packets that exceed the control value at a leisurely time. FIG. 5 shows a graph describing sequence data predicted by a window size as a function. For an arbitrary control value (γ), H denotes a traffic amount that exceeds γ and L denotes a traffic amount that remains without reaching γ. In the case of controlling next predicted traffic with γ, it may be classified into three cases according to γ.

First, if H=L based on γ, all the traffic may be processed without exceeding γ during a window.

Second, if H>L based on γ, all the traffic may be processed within a window section and exceeded traffic needs to be processed after the corresponding window.

Third, if H<L based on γ, all the traffic may be processed within a window section, but a value of γ is lower than γ that makes H and L equal and a message translation speed decreases accordingly.

Therefore, the switch tap may calculate γ that satisfies the first case using the following equation:

$$\int_{w_i}^{w_{i+1}} P_i(t)\,dt = |W| \times \gamma_i$$

In the above equation, the function P(t) may be derived as an approximate function for predicted control traffic and a remainder excluding γ is a constant value (|W| denotes a window size) known in the system and thus, γ may be easily calculated.

The switch tap translates a control message to maintain γ calculated according to the above equation for each switch and delivers the same to a physical switch. The switch tap calculates throughput for the control message translated in real time and maintains a value thereof as γ. To this end, every time a control message is received by a switch, whether throughput exceeds γ needs to be verified. In the case of translating received messages, if throughput does not exceed γ, the switch tap may translate a message and otherwise, may temporarily store the message in a buffer and may translate the stored message when a time is allowed.

Figure 6:
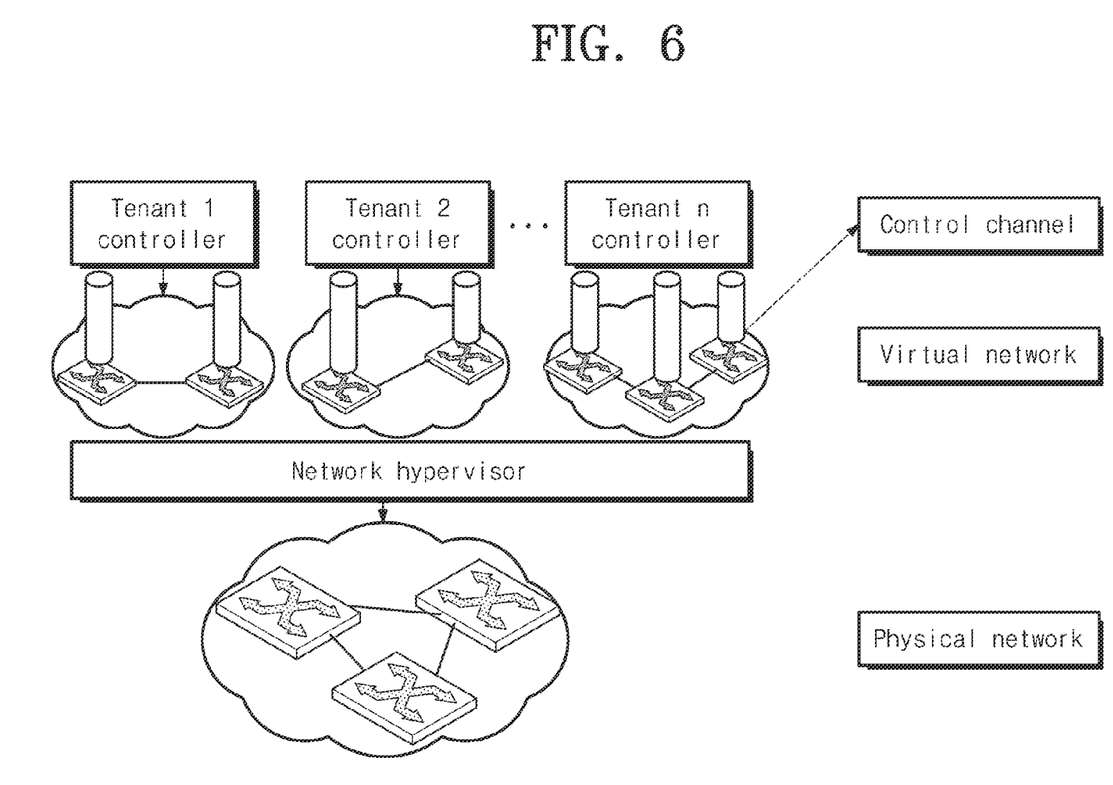
FIG. 6 illustrates a system according to an example embodiment.

FIG. 6 illustrates a system according to an example embodiment.

Referring to FIG. 6, a system referable to as a virtual network system or an SDN-based virtual network system includes a plurality of SDN controllers and a network hypervisor apparatus that provides a virtual network to each of the plurality of SDN controllers (i.e., plurality of tenants). Also, the system includes a plurality of physical switches. The network hypervisor apparatus may virtualize the plurality of physical switches and may provide the virtual network to each of the plurality of SDN controllers.

The network hypervisor apparatus referable to as a hypervisor apparatus refers to an apparatus in which the network hypervisor is implemented and may be implemented as a computing device that includes at least a processor and/or memory. Also, the hypervisor apparatus may perform a translation operation for a message (or packet) transmitted from a control channel formed between each SDN controller and the virtual switch.

Figure 7:
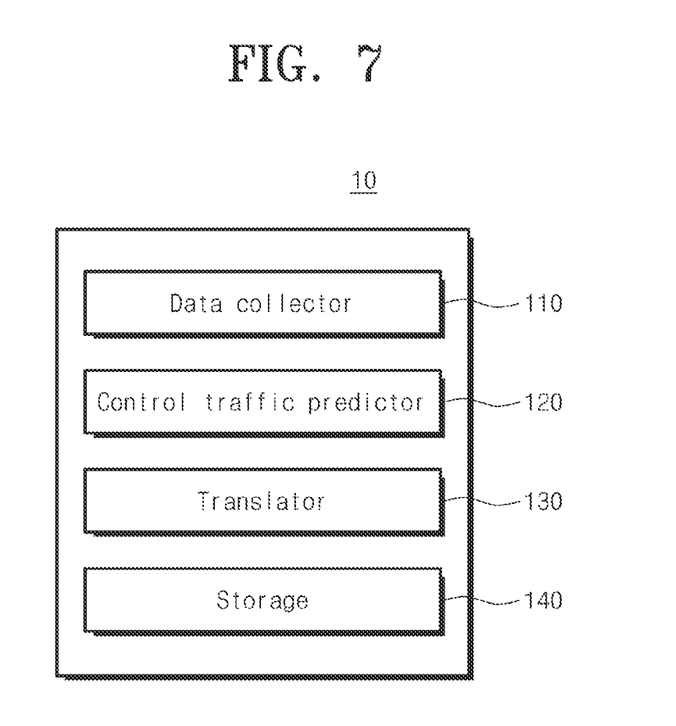
FIG. 7 is a diagram illustrating a network hypervisor apparatus of FIG. 6.

FIG. 7 is a diagram illustrating a hypervisor apparatus of FIG. 6.

Referring to FIG. 7, a hypervisor apparatus 10 may include a data collector 110, a control traffic predictor 120, and a translator 130. Depending on example embodiments, the hypervisor apparatus 10 may further include a storage 140.

The data collector 110 may also be referred to as a traffic meter, a data collection module, and a data collection unit. The data collector 110 may collect data at a predetermined time interval (e.g., 100 ms) during a predetermined time section (e.g., 2 seconds). The collected data may include at least one of a control traffic amount, the number of FLOWMOD messages, the number of PACKETIN messages, the number of STATISTIC messages, the number of hosts connected to a switch, and the number of links connected to the switch.

A data collection operation is performed for each virtual switch. Also, the data collector 110 may repeatedly perform the data collection operation. That is, the data collection operation may be performed every predetermined time section (time window).

Depending on example embodiments, the data collector 110 may also perform preprocessing operation on the collected data.

The control traffic predictor 120 may perform a prediction (or inference) operation on future traffic using a trained prediction model. The prediction model receives predetermined input data and outputs output data corresponding thereto. Here, the input data refers to data collected during a predetermined time section and includes at least one of a control traffic amount, the number of FLOWMOD messages, the number of PACKETIN messages, the number of STATISTIC messages, the number of hosts connected to a switch, and the number of links connected to the switch. Therefore, the prediction model may output a prediction value for at least one of a control traffic amount, the number of FLOWMOD messages, the number of PACKETIN messages, the number of STATISTIC messages, the number of hosts connected to a switch, and the number of links connected to the switch corresponding to a next time section. Further description related to the prediction model that overlaps the aforementioned description is omitted.

Prediction of control traffic may be performed for each (virtual) switch. That is, a future control traffic prediction value for each virtual switch may be individually generated.

The translator 130 may also be referred to as a switch tap and a controller. The translator 130 may derive a control value for each (virtual) switch and may perform a translation operation according to the derived control value. In detail, the translator 130 may calculate the control value using the aforementioned equation. Also, the translator 130 may perform a translation operation for a control message of each control channel based on the calculated control value. Here, to delay the translation operation for control traffic that exceeds the control value, the translator 130 may include a predetermined buffer.

The storage 140 may store an operation system (OS), an application, an app, a program, and a trained model necessary for driving the hypervisor apparatus 10. Also, the storage 140 may temporarily or non-temporarily store data collected by the data collector 110, processed data, a prediction result by the control traffic predictor 120, and a prediction result by the translator 130.

The aforementioned method according to example embodiments may be implemented in a form of a program executable by a computer apparatus. Here, the program may include, alone or in combination, a program instruction, a data file, and a data structure. The program may be specially designed to implement the aforementioned method or may be implemented using various types of functions or definitions known to those skilled in the computer software art and thereby available. Also, here, the computer apparatus may be implemented by including a processor or a memory that enables a function of the program and, if necessary, may further include a communication apparatus.

The program for implementing the aforementioned method may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although some example embodiments of an apparatus and method are described, the apparatus and method are not limited to the aforementioned example embodiments. Various apparatuses or methods implementable in such a manner that one of ordinary skill in the art makes modifications and alterations based on the aforementioned example embodiments may be an example of the aforementioned apparatus and method. For example, although the aforementioned techniques are performed in order different from that of the described methods and/or components such as the described system, architecture, device, or circuit may be connected or combined to be different form the above-described methods, or may be replaced or supplemented by other components or their equivalents, it still may be an example embodiment of the apparatus and method.

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

A method according to an embodiment of the invention can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions. Examples of the program instructions may include not only machine language codes produced by a compiler but also high-level language codes that can be executed by a computer through the use of an interpreter, etc. The hardware mentioned above can be made to operate as one or more software modules that perform the actions of the embodiments of the invention and vice versa.

While the present invention is described above referencing a limited number of embodiments and drawings, those having ordinary skill in the relevant field of art would understand that various modifications and alterations can be derived from the descriptions set forth above. For example, similarly adequate results can be achieved even if the techniques described above are performed in an order different from that disclosed, and/or if the elements of the system, structure, device, circuit, etc., are coupled or combined in a form different from that disclosed or are replaced or substituted by other elements or equivalents. Therefore, various other implementations, various other embodiments, and equivalents of the invention disclosed in the claims are encompassed by the scope of claims set forth below.

What is claimed is:

1. A network hypervisor apparatus for providing a software defined networking (SDN)-based virtual network, the network hypervisor apparatus comprising:
   a data collector configured to collect control traffic data and network topology information for each virtual switch;
   a control traffic predictor configured to predict future control traffic based on the control traffic data and the network topology information; and
   a translator configured to translate a control message from a virtual switch to a physical switch based on a prediction result,
   wherein the control traffic predictor is configured to perform prediction using a prediction model based on a pretrained long short term memory (LSTM)-autoencoder model,
   wherein the prediction model comprises:
   an encoder including LSTM cells corresponding to the number of past sequence data, each LSTM cell generating a new cell state for the past sequence data, and a last LSTM cell generating a single piece of compressed data in an encoded state; and
   a decoder including LSTM cells and activation functions, receiving the single piece of compressed data and the past sequence data, and predicting future sequence data when each of the LSTM cells outputs predicted data.

2. The network hypervisor apparatus of claim 1,
   wherein the control traffic data includes a control traffic amount measured at a predetermined time interval during a predetermined time section and the number of control traffic messages, and
   wherein the network topology information includes the number of hosts and the number of links connected to a virtual switch.

3. The network hypervisor apparatus of claim 2, wherein the number of control traffic messages includes the number of FLOWMOD messages, the number of PACKETIN messages, and the number of STATISTIC messages.

4. The network hypervisor apparatus of claim 1, wherein the translator is configured to, for each virtual switch:
   calculate a control value $\gamma$ that satisfies equation,
   store, in a buffer, a control message that is received by exceeding the control value $\gamma$, and
   perform a translation operation on the control message stored in the buffer when the received message does not reach the control value $\gamma$.

5. The network hypervisor apparatus of claim 4, wherein the equation is $$\int_{w_i}^{w_{i+1}} P_i(t)\,dt = |W| \times \gamma_i,$$

and
   a function P(t) is an approximation function for predicted control traffic and the |W| is a size of a window that is the predetermined time section.

* * * * *